Oct. 8, 1963 HANS-JOACHIM DAECHE 3,106,143
MONOCULAR MIRROR REFLEX CAMERA
Filed Aug. 11, 1960 3 Sheets-Sheet 1

Inventor
HANS-JOACHIM
DAECHE
By Irvin S. Thompson
Attorney

Oct. 8, 1963  HANS-JOACHIM DAECHE  3,106,143
MONOCULAR MIRROR REFLEX CAMERA
Filed Aug. 11, 1960  3 Sheets-Sheet 3

Inventor
HANS-JOACHIM DAECHE
By Irwin S. Thompson
Attorney

United States Patent Office 3,106,143
Patented Oct. 8, 1963

3,106,143
MONOCULAR MIRROR REFLEX CAMERA
Hans-Joachim Daeche, Dresden, Germany, assignor to VEB Kamera- und Kinowerke Dresden, Dresden, Germany
Filed Aug. 11, 1960, Ser. No. 48,905
5 Claims. (Cl. 95—42)

The invention relates to a monocular mirror reflex camera with between-the-lens shutter and concerns essentially a cooperating gearing for the winding and release of the various working operations, comprising especially the movement of the mirror into and out of the reflex position, the opening and closing of the shutter blades for the purpose of viewing through the viewfinder, the cocking and release of the shutter for the exposure and finally the forward movement of the film picture by picture.

Monocular mirror reflex cameras with between-the-lens shutter are already known wherein in combination with the shutter-cocking ring or film feed, by special control arrangements successively the mirror is brought into the viewfinding position, whereupon the opening of the shutter blades takes place for the purpose of viewing through the viewfinder and at the same time the cocking of the shutter takes place, whereupon these working operations are so instigated by a camera-side release arrangement that successively the shutter blades close, the mirror is pivoted out of the reflex position and then the shutter is released for the purpose of exposure.

In one camera wherein in combination with the shutter-cocking ring the above-mentioned working operation takes place, this is effected through a control disc coupled with the shutter-cocking ring, which disc after freeing effected by the release, in its return driven by means of spring force, successively effects the closing of the shutter blades, the hinging up of the mirror and the release of the shutter for the exposure. In contrast thereto in another camera, the cocking of these arrangements takes place in combination with the film feed in a manner wherein by means of a partially toothed gear wheel connected with the film feed and provided with a crank pin on the one hand in the film feed the crank pin through a slider moves the mirror into the viewfinding position and on the other hand the partially toothed gear wheel through an additional toothed wheel gearing engaging therewith intermittently actuates a segment, which in turn through a slider then acts upon a shutter gearing, which effects the opening of the shutter blades for viewing through the viewfinder and at the same time the cocking of the shutter.

The mirror reflex cameras with between-the-lens shutter which have also become known differ from the control devices provided in the aforementioned cameras in principle due to the fact that in these the cocking of the various working operations does not take place in combination with the shutter cocking ring and the film feed, but is effected through a manually actuated cocking element, which in its cocking movement successively brings the mirror into the viewfinding position, fully opens the shutter blades with the diaphragm for the purpose of viewing through the viewfinder and finally cocks the shutter. Here the release of these working operations according to one camera embodiment takes place simultaneously through the manually actuated cocking element at the end of its return movement, while according to the other camera embodiment the release is actuated by a separate release arrangement arranged on the camera-side.

The control of the working operations known therefrom in combination with a control ring coupled with the shutter cocking ring and similarly the control arrangements provided in combination with the film feed for the various working operations require a number of gear parts which complicate the assembly of the camera and render the cocking movement difficult. They further necessitate a between-the-lens shutter specially adapted to these gear connections, which shutter in turn must also be equipped with an additional control gearing for the blade rings, which effect the opening and closing of the shutter blades for the purpose of viewing through the viewfinder and for exposure. Thus not only do disadvantageous delays in the course of the individual working operations occur, but also thus the interchangeability of the shutter is rendered difficult, so that this cannot be effected without dismantling the shutter or the camera. On the other hand, the proposal to shorten the disadvantageous running-off delays necessitated by the gear expenditure, by the provision of stronger return springs, does not provide a satisfactory result. This is especially due to the fact that such a strengthening of the return springs accordingly renders the cocking movement difficult and in combination with the mass forces thereby accelerated has a disadvantageous effect upon the delicate shutter parts. The conditions here set forth also apply to the mirror-reflex cameras with between-the-lens shutter which have become further known in the meantime, wherein the individual working operations are controlled by a rotating cam gearing driven by a spring force.

Now the invention has the problem of providing for a monocular mirror reflex camera with between-the-lens shutter a cooperating gearing for the cocking and release of the working operations here provided, wherein apart from a simplified embodiment of the gearing such a connection with the between-the-lens shutter is hereby to be produced that an additional control gearing for the shutter blades becomes superfluous therein and the shutter can be installed in the camera without dismantlement. Here one particular feature of the problem consists in that with the cocking gearing the release arrangement should so cooperate that its actuation is prevented during the cocking movement and is only freed in each case after this cocking movement is completed.

This problem is solved according to the invention due to the fact that the cocking gearing, preferably constructed as rapid cocking gearing, on the one hand is provided with a crank rocking lever, the rocking lever acting directly upon the blade rings serving for the opening and closing of the shutter blades and the coupling by means of its swinging movement at the same time bringing the reflex mirror into the viewfinding position and in that with the cocking gearing on the other hand there is associated a blocking arrangement cooperating with the release, possessing a blocking disc with recesses, by which the release movement is only freed after complete cocking movement.

Accordingly in accordance with the invention the crank rocking lever connected with the cocking gearing actuates both the mirror movement into the reflex position and also the movement of the blade rings of the shutter for the opening of the blades for viewing through the viewfinder and for the cocking of the shutter. Thus here all additional transmission arrangements are omitted and also the control gearing otherwise necessary for the movement of the blade rings in the shutter is omitted. Here by the crank rocking lever, which acts in accordance with the invention directly upon the blade rings, the further advantage is achieved that without an otherwise necessary dismantling of the shutter, the shutter can be installed in the camera and its connection with the cocking gearing can be produced.

The blocking arrangement also associated with the cocking gearing is so constructed in accordance with the invention that the release movement cooperating therewith, of the release, is blocked and released by a blocking disc connected with the cocking gearing and provided with recesses, in such fashion that a blocking lever movable by the release can only fall into these recesses after the cocking movement is completely terminated. Thus in the case of stout construction a blocking arrangement is provided which works noiselessly and prevents incorrect release and the possibility of empty pictures and double exposures in reliable fashion. This blocking arrangement here ensures that it withstands even an incorrect release without harmful consequences.

In fact, blocking arrangements are already known in photographic cameras, which serve for the avoidance of empty pictures and double exposures. These however in contrast to the described blocking arrangement of the invention, work in a manner wherein by a reversing ratchet the return movement of the cocking gearing and the release movement are only freed after complete cocking. Here however the disadvantage arises that the reversing ratchet in combination with the ratchet wheel provided with ratchet teeth, does not work noiselessly and on account of its delicacy easily causes disturbances in the case of incorrect handling.

The blocking arrangement for the release, associated with the cocking gearing, is preferably arranged in accordance with the invention in the space above the film take-up spool and in the space beneath the latter the crank rocking lever for the control of the mirror and of the shutter blade rings is arranged, the connection of the blocking arrangement with the crank rocking lever taking place by means of a spindle of the cocking gearing extending through the film take-up spool. Further details and features of the invention are explained in the following description of an example of embodiment, which is illustrated diagrammatically in the drawings in FIGURES 1–7.

Figure 1:
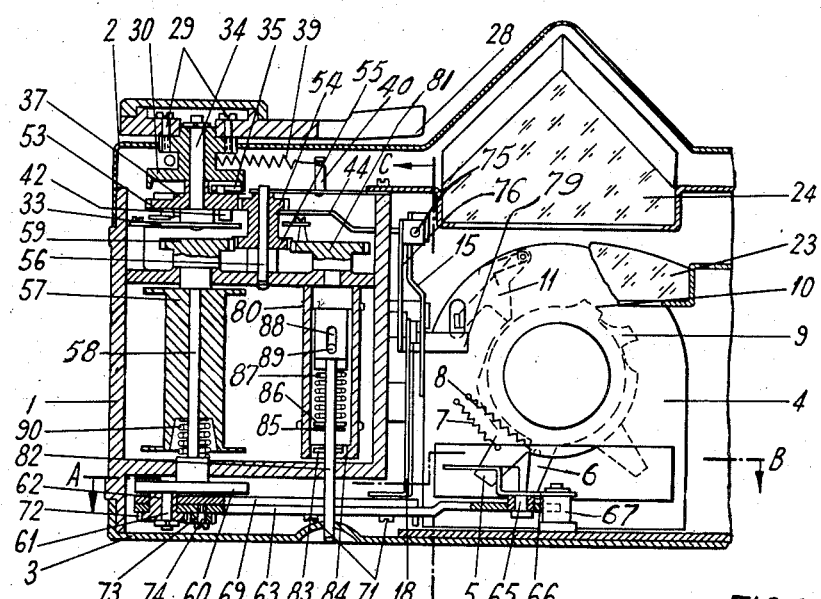
FIGURE 1 shows a part of the monocular mirror reflex camera seen from the rear in section with the cocking and release gearing in accordance with the invention.

According to the example of embodiment as illustrated, the camera housing 1 is enclosed on the upper side by a covering cap 2 and on the lower side by a bottom cap 3. On the front of the camera housing 1 there is secured the between-the-lens shutter 4, with which in known manner there is associated a picture-taking objective lens (not shown in the drawing). The representation of the between-the-lens shutter is limited to the shutter cocking ring 5 mounted centrally around the exposure aperture, with which ring there is coupled the blade drive ring, and the blade mounting ring 6, which are moved back by the springs 7, 8 in each case into the position as illustrated in FIGURE 1. The shutter cocking ring 5 is provided with a blocking nose 9 and the blade mounting ring 6 is provided with a blocking nose 10, which cooperate with a locking pawl 11 subjected to spring action. By the latter the cocking ring 5 and the blade mounting ring 6 are held fast in the cocking position and released from this position by release of the locking pawl 11 for the return into the initial position. The locking noses 9, 10 possess a different height, in such fashion that on release of the locking pawl 11 firstly the blade mounting ring 6 and later the shutter cocking ring 5 are released for return. The same manner of operation can also be achieved due to the fact that the locking noses 9, 10 possess an equal height and the locking lever 11 is provided with two locking hooks of different heights, or with every ring 5, 6 there is associated a locking pawl to be released successively.

In known manner, in the cocking movement, the blade drive ring coupled with the shutter cocking ring 5 effects the opening of the shutter blades for the purpose of viewing through the viewfinder, and on reaching of this open position then the blade mounting ring 6 is driven, so that the shutter blades remain opened in the cocked position. On release by the locking pawl 11 firstly the release of the blade mounting ring 6 takes place, which in its return movement closes the opened shutter blades, whereupon the release of the cocking ring 5 takes place, which then in its return in turn releases the blade drive ring for the opening and closing of the shutter blades for the purpose of the exposure. Here the duration of the exposure operation can be regulated by an escapement associated with the shutter. The representation of these arrangements, which are not the object of the present invention, was dispensed with.

Figure 6:
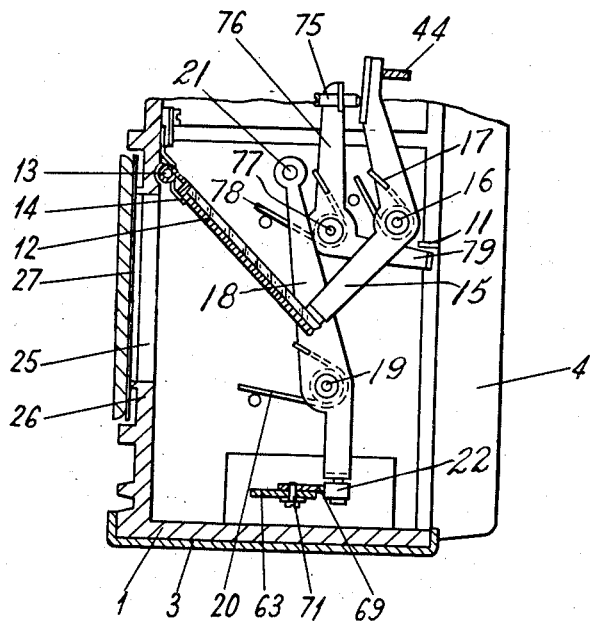
FIGURE 6 shows a lateral section of the camera, seen from the left, with the reflex arrangement.

Behind the between-the-lens shutter 4, as shown in FIGURE 6, the reflex mirror 12 is arranged for pivoting about the mounting 13. This mirror is subject to the action of a torsion spring 14 held by the mounting 13 and is held in the effective reflex position by a locking lever 15 made with two arms, which is pivotable about the mounting 16 fast with the housing and is moved into the locking position by the torsion spring 17 thereof. For the movement of the reflex mirror 12 into the reflex position there serves the two-armed thrust lever 18, which is pivotable about the mounting 19 fast with the housing and is moved back in each case into its initial position by the torsion spring 20 thereof. The thrust lever 18 possesses on the upper lever arm a thrust roller 21 and by means of this moves the mirror 12 out of the hinged-up, ineffective position into the reflex position. This movement is controlled by a crank rocking lever described in greater detail in the following embodiments, which acts upon the roller 22 mounted on the lower arm of the thrust lever 18.

The ray path coming from the objective lens and cleared by the opened shutter blades is deflected by the mirror 12 situated in the reflex position, at right angles for the production of a picture, to the picture area lens 23, and can be viewed on the prescribed scale laterally and vertically correctly in combination with a viewfinder arrangement arranged thereabove, preferably provided with a roof-type prism 24. After release of the mirror 12 has been effected the latter is hinged up by the action of the torsion spring 14 out of the effective reflex position, and the objective ray path passes during the exposure operation of the shutter 4 through the image aperture 25 to the film 27 resting on the film track 26, and exposes the film.

Figure 3:
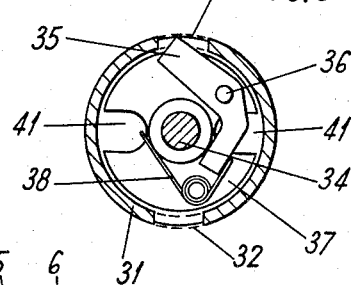
FIGURE 3 shows a section through the over-running clutch of the cocking gearing.
Figure 7:
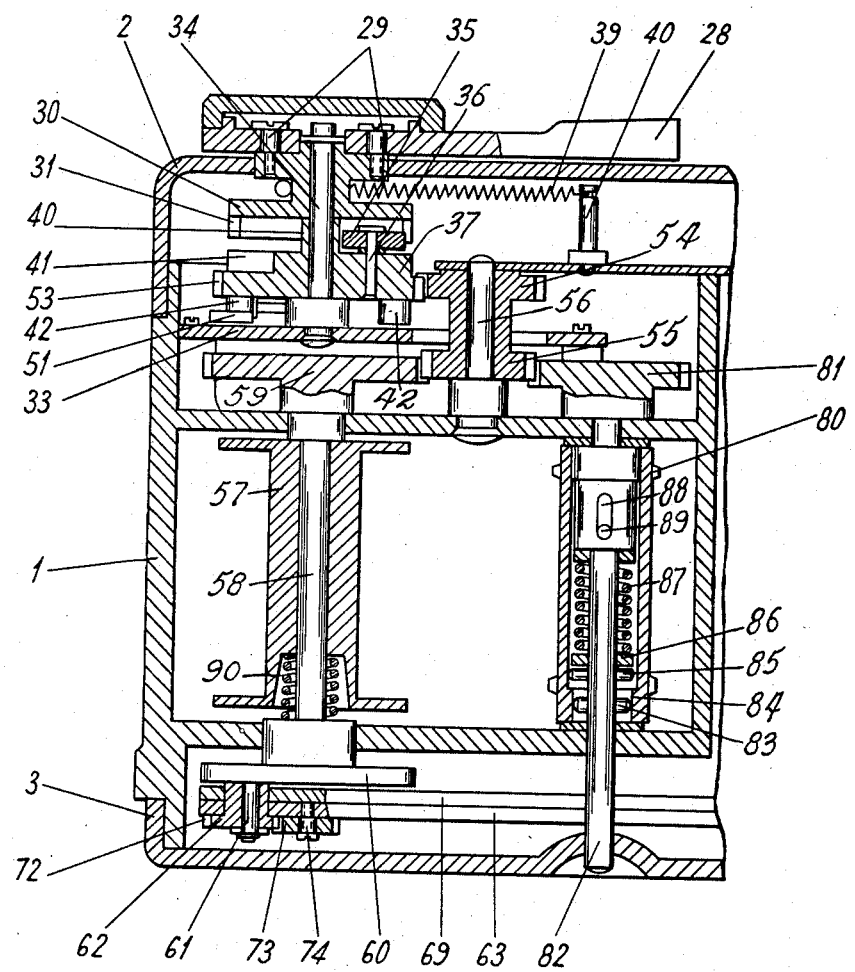
FIGURE 7 shows a section through the cocking gearing in enlarged representation.

For the forward movement of the film picture by picture and for the cocking and release of the reflex mirror 12 and of the between-the-lens shutter 4 there serve the following arrangements:

The cocking gearing, preferably constructed as rapid cocking device, is actuated by a reciprocating operating handle 28, which is connected by means of screws 29 with a drive disc 30. The latter possesses, as shown in FIGURES 3 and 7, an edge 31 projecting on the under side, with two recesses 32. The drive disc 30 is rotatably mounted about a bolt 34 secured on the plate 33, and cooperates with its two recesses 32 with a locking pawl 35, which is movably connected through a bolt 36 with a locking disc 37, which is also rotatably mounted about the bolt 34. The locking pawl 35 is pressed by a torsion spring 38 in each case into the recesses 32 of the drive disc 30 in such fashion that thereby in the cocking movement actuated by the operating handle 28 the locking disc 37 is driven and the latter is released in the return movement of the operating handle 28. This return movement is effected by a spring 39 attached to the drive disc, the upper end of which spring is attached to a bolt 40 fast with the housing. A spacing sleeve mounted about the bolt 34 ensures the spacing between the drive disc 30 and the locking disc 37.

Figure 5:
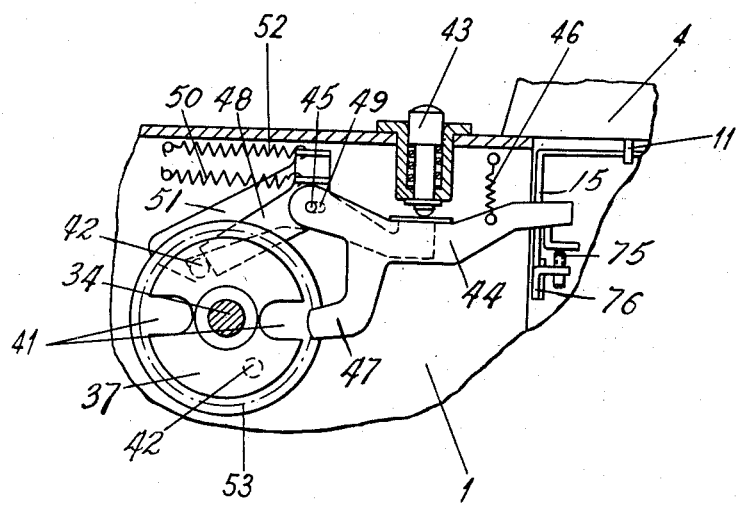
FIGURE 5 shows the blocking arrangement connected with the cocking gearing and cooperating with the release arrangement.

The locking disc 37 possesses, as shown especially in FIGURE 5, on its upper side two inlet recesses 41 and on its lower side two projecting locking pins 42. A release lever 44 actuated by the release button 43 cooperates therewith, this lever being mounted about a stationary bolt 45 and moved back in each case into the initial position by a spring 46. The release lever 44 is provided with a locking nose 47, which fits into the recesses 41 of the locking disc 37. The release lever 44 at the same time actuates a locking lever 48, which cooperates with the two locking pins 41 secured on the under side of the locking disc 37. The locking lever 48 is mounted by means of a slot 49 about the stationary bolt 45 and is drawn by a spring 50 against the locking pin 42 in the locking position. Furthermore, with these locking pins 42 there is associated also an additional locking pawl 51, which is similarly mounted for pivoting about the stationary bolt 45 and is moved by the spring 52 into the locking position.

After the cocking movement has been effected, the locking arrangement as explained assumes the position which may be seen from FIGURE 5. Here the locking disc 37 is prevented from turning back by the locking pawl 51, which engages behind one locking pin 42 and before the latter the other locking lever 48 is pivoted at the same time, so that the locking disc 37 and thus the cocking movement following is locked on both sides. In this position one recess 41 of the locking disc 37 is situated at the same time exactly opposite the locking nose 47 of the release lever 44, so that now the release 43 can be actuated without hindrance. During this release movement, on the one hand, the locking nose 47 comes into the recess 41 and thereby locks the cocking movement during the release operation, on the other hand here the release lever 44 moves the locking lever 48 out of its locking position and the latter, as a result of its slot 49 and the action of the spring 50, then slides out beyond the locking pin 42 as far as permitted by the slot 49. Thus after return of the release knob 43 and of the release lever 44 actuated thereby, the cocking is released for the following cocking movement.

Due to this construction in accordance with the invention such an alternate cooperation of the cocking movement with the release movement is ensured that on the one hand in each case only after cocking has been completed is the release freed and on the other hand the cocking movement remains locked until the release movement is completed. Thus a functionally incorrect actuation of the cocking and release arrangement, with the possibility therein involved of empty pictures and double exposures, is prevented in a reliable fashion. The operating handle 28 is preferably so coupled with the locking arrangement that at every half revolution a cocking movement has taken place. Accordingly, the locking disc 37 possesses in each case two recesses 41 and locking pins 42 at 180° intervals. This ratio can also be varied in such manner that for example for every cocking one full revolution or only one third of a revolution of the operating handle 28 is necessary. Accordingly then, the locking disc 37 should be provided with only one recess 41 and locking pin 42 or with three recesses 41 and locking pins 42 offset at 120° intervals.

Figure 2:
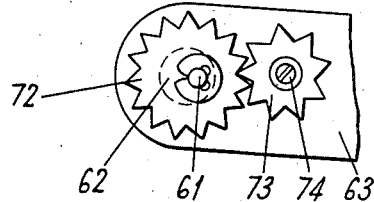
FIGURE 2 shows an adjusting arrangement for the crank rocking lever.

The locking disc 37 is at the same time provided with a toothed wheel 53 by which, through an intermediate drive consisting of gear wheels 54, 55, which is rotatably mounted about the bolt 56 fast with the housing, by means of the gear wheel 55 on the one hand a crank rocking lever drive is driven for the cocking of the mirror 12 and of the shutter blade rings 5, 6, on the other hand the forward movement of the film picture by picture is driven. The crank rocking lever gearing possesses a spindle 58 conducted preferably through the film take-up spool 57, which spindle extends with the upper end into the space above the film spool 57 and with the lower end into the space below the film spool 57. On the upper end of the spindle 58 there is secured a toothed wheel 59, which engages with the intermediate wheel 55. On the lower end of the spindle 58 there is secured a crank disc 60, the crank pin 61 of which is received by an eccentric bearing bush 62. This serves as mounting for the crank rocking lever, which consists of the coupling member 63 and the rocking lever 66 engaging in the fork 64 thereof by means of a link bolt 65, which rocking lever 66 is movably mounted about the bolt 67 fast with the housing. A torsion spring 68 presses the rocking lever 66 with its link bolt 65 constantly against the fork 64 of the coupling member 63. Furthermore, the coupling member 63 is also provided with a setting arm 69 also mounted about the bearing bush 62, which arm can be adjusted laterally in relation to the coupling member 63 through slots 70 by means of screws 71. The eccentric bearing bush 62 is, as shown in FIGURES 2 and 7, provided with a ratchet wheel 72, in the teeth of which there engages a setting wheel 73 also provided with ratchet teeth, which wheel is screwed fast to the coupling member 63 through a mounting screw 74. By release of the mounting screw 74 and rotation of the setting wheel 73 the coupling member 63 can be adjusted in relation to the crank pin 61 in the direction of its length, and thus the movement of the coupling rocking lever 66 can be adjusted accordingly, whereby an adjustment for wear is achieved in a simple manner.

Figure 4:
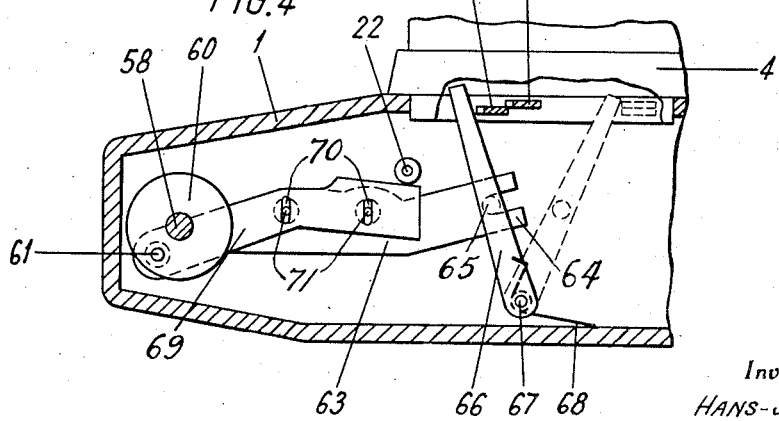
FIGURE 4 shows the part of the camera according to FIGURE 1, seen from above, in section along the section lines A—B.

The coupling rocking lever 66 is so mounted that in its rocking movement effected by the cocking movement of the crank disc 60, it acts successively on the shutter cocking ring 5, then on the blade mounting ring 6 of the between-the-lens shutter 4 and shifts the latter into the locking position held by the locking pawl 11, which position is illustrated in chain lines in FIGURES 1 and 4. Here the torsion spring 68 has the effect that both in this cocking movement and also in the following return movement the crank rocking lever 66 always remains in the fork 64 of the coupling member 63. During the cocking movement, through its swinging movement, the coupling member 63 acts by means of its setting arm 69 on the roller 22 and thereby through the thrust lever 18 moves the reflex mirror 12 into the reflex position visible in FIGURE 6, in which the mirror 12 is held by the lockng lever 15. Here the adjustability of the coupling arm 69 within the slots 70 in a simple manner permits a precise adjustment of the coupling arm 69 for the movement of the reflex mirror 12.

The release of the mirror 12 from the reflex position and of the shutter takes place, as may be seen from FIGURES 5 and 6, through the release lever 44 actuated by the release button 43, which lever here acts upon the mirror locking lever 15. The latter in turn actuates a bell-crank lever 76 resting on it by means of a set screw 75, which lever 76 is mounted movably about the mounting 77 fast with the housing and is pressed by means of a torsion spring 78 on the mirror locking lever 15. This bell-ranck lever 76 engages with its other arm 79 on the locking pawl 11 of the shutter rings 5, 6 and thereby moves these out of the locking position. The sequence of this release operation is here so adapted that in the release actuated by the release button 43, through the release lever 44 by way of the mirror locking lever 15 the bell-crank lever 76, 79 first lifts the locking pawl 11 so far that thus the blade mounting ring 6 is released for the closure of the shutter blades. Thereupon by further pivoting of the locking lever 15 the release of the reflex mirror 12 out of the reflex position takes place and finally the locking lever 11 then frees the shutter cocking ring 5, in the running-off of which the blade drive ring thereby released effects the exposure for the film 27 according to the exposure time set in each case. In the succeeding cocking movement by the operating handle 28 here the drive disc 30 connected therewith, by means of the locking pawl 35 engaging in its recesses 32, through the locking disc toothed wheel 33 and the intermediate drive 54, 55, through the toothed wheel 59, drives the crank disc connected with the latter. This disc here by means of its crank pin 61, 62 moves the crank rocking lever 63—71 connected therewith in such fashion that the coupling arm 69, through the thrust lever 18, first moves the reflex mirror 12 into the effective reflex position, thereupon the crank rocking lever 66 moves the blade mounting ring 6 for the opening of the shutter blades for the purpose of view through the viewfinder, and in the course of this movement also shifts the shutter cocking ring 5 into the locking position held by the locking pawl 11, whereby the shutter is cocked. Simultaneously with this cocking movement, through the intermediate wheel 55 with which the gear wheel 81 connected with the film feed wheel 80 also engages, the forward movement of the film picture by picture is completed.

The film feed wheel 80 is provided in known manner with a coupling for winding back, which can be actuated through the release pin 82 lying in a depression and projecting out of the camera bottom 3. For this purpose in the release pin 82 there is arranged a coupling pin 83, which, as shown in FIGURES 1 and 7, engages in a corresponding slotting 84 of the film feed wheel 80. Furthermore, the release pin 82 also possesses a second pin 85 by which, by means of the disc 86, a compression spring 87 is supported, which moves the release pin 82, 83 in each case into the coupling position. This is defined by the guide pin 89 movable in the slot guide 88, which pin is connected with the release pin 82. On pressing in of the release pin 82 against the action of the compression spring 87, the coupling pin 83 comes out of the region of the coupling slot 84 and thus the film feed wheel 80 is uncoupled from the gear connection 81, so that the winding back can be effected. The film feed wheel 80 here rotates loosely about the mounting formed by the gear wheel 81 and the release pin 80. The tension of the film feed is here regulated through a spring 90 arranged in the film take-up spool 57, which spring rests on the flange of the crank disc 60 and thereby effects a friction with the cocking gearing.

I claim:

1. A monocular mirror reflex camera comprising a casing, a between-the-lens shutter device and objective lens mounted in the casing including a shutter cocking ring, diaphragm blades for defining the lens aperture and a blade driving ring operatively connected to said diaphragm blades, said cocking ring and blade driving ring being movable between a rest position and a cocked position, a viewfinder device arranged in the casing, a reflex mirror pivotally mounted in the casing adjacent the viewfinder and pivotable to one position so as to reflect the light rays from the objective lens into the viewfinder and to another position clear of the optical axis of the objective lens so as to allow the light rays to pass from the latter to the film when a photograph is being taken, a film take-up spool rotatably mounted within the casing, a film feed wheel, a cocking mechanism for cocking the shutter device, a shaft rotatably mounted within the casing, a driving member operatively connected to said shaft for effecting rotation thereof, a free wheel device drivably connected to said shaft, a plurality of gear wheels operatively connected between said free wheel device and film spool and the film feed wheel, a crank arrangement drivably connected to said free wheel device, a cocking arm cooperable with said cocking ring and blade driving ring pivotably mounted in the casing for reciprocal movement by the crank arrangement, and a first lever mounted in the casing and drivable by said crank arrangement to effect movement of the mirror into the optical axis of the objective lens, a shutter release device capable of releasing the cocking ring and blade driving ring from their cocked positions, a second lever operable by said release device to move the mirror out of the path of the optical axis as the shutter device is actuated and a locking device including a locking disc connected between said free wheel coupling and said gear wheels, said disc having at least one recess, a locking lever pivotally mounted in the casing having a nose which is engageable with said recess and operable by said shutter release device when the disc is in a position where the recess is adjacent said nose, at least one locking pin carried by said locking disc, a locking pawl capable of engaging said pin to hold the disc against reversal of movement, and a two-armed lever pivotally mounted in the casing, one arm of which being engageable with said locking pin to prevent movement of said disc, the other arm being movable by said shutter release device whereby the locking pin is disengaged by the two-armed lever.

2. A monocular mirror reflex camera comprising a casing, a between-the-lens shutter device and objective lens mounted in the casing including a shutter cocking ring, diaphragm blades for defining the lens aperture and a blade driving ring operatively connected to said diaphragm blades, said cocking ring and blade driving ring being movable between a rest position and a cocked position, a viewfinder device arranged in the casing, a reflex mirror pivotally mounted in the casing adjacent the viewfinder and pivotable to one position so as to reflect the light rays from the objective lens into the viewfinder and to another position clear of the optical axis of the objective lens so as to allow the light rays to pass from the latter to the film when a photograph is being taken, a film take-up spool rotatably mounted within the casing, a film feed wheel, a cocking mechanism for cocking the shutter device, a shaft rotatably mounted within the casing, a driving member operatively connected to said shaft for effecting rotation thereof, a free wheel device drivably connected to said shaft, a plurality of gear wheels operatively connected between said free wheel device and film spool and the film feed wheel, a crank disc drivably connected to said free wheel device, a pin mounted on the disc offset from the central axis of the latter, a bush eccentrically mounted on the pin, a crank arm carried at one end thereof by the bush, a cocking arm cooperable with said cocking ring and blade driving ring pivotably mounted in the casing for reciprocal movement by the crank arrangement, and a first lever mounted in the casing and drivable by said crank arrangement to effect movement of the mirror into the optical axis of the objective lens, a shutter release device capable of releasing the cocking ring and blade driving ring from their cocked positions, a second lever operable by said release device to move the mirror out of the path of the optical axis as the shutter device is actuated, and a locking device including a locking disc connected between said free wheel coupling and said gear wheels, said disc having at least one recess, a locking lever pivotally mounted in the casing having a nose which is engageable with said recess and operable by said shutter release device when the disc is in a position where the recess is adjacent said nose, at least one locking pin carried by said locking disc, a locking pawl capable of engaging said pin to hold the disc against reversal of movement, and a two-armed lever pivotally mounted in the casing, one arm of which being engageable with said locking pin to prevent movement of said disc, the other arm being movable by said shutter release device whereby the locking pin is disengaged by the two-armed lever.

3. A monocular mirror reflex camera according to claim 2 having a setting arm carried on the crank arm and adapted to control the movement of the first lever.

4. A monocular mirror reflex camera according to claim 2 having two recesses in the locking disc, said recesses being diametrically opposed to one another.

5. A monocular mirror reflex camera according to claim 2 having two locking pins carried on the locking disc, said locking pins being diametrically opposed to one another.

References Cited in the file of this patent

UNITED STATES PATENTS

| | | |
|---|---|---|
| 2,230,251 | Jochum | Feb. 4, 1941 |
| 2,348,510 | Aiken | May 9, 1944 |
| 2,730,025 | Faulhaber | Jan. 10, 1956 |